United States Patent
Jayapalan et al.

(10) Patent No.: US 7,734,278 B2
(45) Date of Patent: Jun. 8, 2010

(54) METHOD AND SYSTEM FOR PROVIDING CREDIT FOR PARTICIPATION IN AN AD HOC NETWORK

(75) Inventors: Jay P. Jayapalan, Buffalo Grove, IL (US); Stephen D. Magee, Scottsdale, AZ (US)

(73) Assignee: Motorola, Inc., Schaumburg, IL (US)

( * ) Notice: Subject to any disclaimer, the term of this patent is extended or adjusted under 35 U.S.C. 154(b) by 629 days.

(21) Appl. No.: 11/390,901

(22) Filed: Mar. 28, 2006

(65) Prior Publication Data

US 2007/0230438 A1    Oct. 4, 2007

(51) Int. Cl.
*H04M 11/00*    (2006.01)
(52) U.S. Cl. .......................... 455/407; 705/53
(58) Field of Classification Search ......... 455/406–411, 455/11.1; 55/407
See application file for complete search history.

(56) References Cited

U.S. PATENT DOCUMENTS

| 2002/0183038 A1 | 12/2002 | Comstock et al. |
| 2005/0220101 A1 | 10/2005 | Westhoff et al. |
| 2005/0227616 A1 * | 10/2005 | Takatani et al. ............. 455/11.1 |

FOREIGN PATENT DOCUMENTS

| WO | WO 2004/088935 | * 10/2004 | ............. 455/422.1 |
| WO | WO 2004088935 A1 | * 10/2004 | |

OTHER PUBLICATIONS

Zhong, S. et al., "Sprite: A Simple, Cheat-Proof, Credit-Based Systems for Mobile Ad-Hoc Networks", IEEE INFOCOM, 2003, pp. 1987-1997.

* cited by examiner

*Primary Examiner*—Nick Corsaro
*Assistant Examiner*—Amanuel Lebassi
(74) *Attorney, Agent, or Firm*—Randi L. Karpinia

(57) ABSTRACT

A method and system for providing credit for participation in an ad hoc wireless communication network is useful for improving network efficiency. The method includes receiving at a first network node a first data packet transmitted from a second network node (step 305). The first data packet includes payload data and credit claim data. The first node then determines that the credit claim data should be forwarded to a credit accounting authority (step 310), so a second data packet is then transmitted from the first node to the credit accounting authority (step 315). The second data packet includes some of the credit claim data. The first node then transmits a third data packet to a third network node, where the third data packet includes the payload data (step 320).

19 Claims, 3 Drawing Sheets

METHOD AND SYSTEM FOR PROVIDING CREDIT FOR PARTICIPATION IN AN AD HOC NETWORK

FIELD OF THE INVENTION

The present invention relates generally to data routing in ad hoc wireless communications networks, and in particular to providing incentives to network nodes to participate as intermediate nodes.

BACKGROUND

Many wireless communications systems require a rapid deployment of independent mobile users as well as reliable communications between user nodes. Mobile Ad Hoc Networks (MANETs) are based on self-configuring autonomous collections of mobile users who communicate with each other over wireless links having limited bandwidths. MANETs are usually temporary packet radio networks which do not involve significant, if any, supporting infrastructure. Rather than employing fixed base stations, each user node in a MANET can operate as a router for other user nodes, thus enabling expanded network coverage that can be set up quickly, at low cost, and which is highly fault tolerant.

MANETs provide critical communication services in various environments involving, for example, emergency services supporting police and fire personnel, military applications, industrial facilities and construction sites. Routing communications between two nodes in a static network generally involves simply determining the shortest route between the two nodes. However, in a MANET, the determination of an optimal communication route may involve additional factors. For example, propagation path losses, interference between users, and channel fading may require the use of an indirect route between two nodes in order to provide an acceptable Quality of Service (QoS) to the network users.

Because MANETs generally do not comprise significant supporting infrastructure, such as fixed base stations, but rely on user nodes to act as relay or intermediate nodes, participation in a MANET by a high number of users is often critical to network functionality. For example, if a MANET covers a significant area that is wider than the transmission range of any single user node, a transmission across the full width of the MANET will require relaying the transmission through at least one intermediate user node. Unless an adequate number of such intermediate, or "multi-hop", user nodes participate in the network, and enable transmissions addressed to other nodes to be routed through the intermediate user nodes, then the network breaks down and at least some transmissions may not be completed. Conversely, as more user nodes participate in a MANET, the average distance between nodes decreases, and reliability and link quality increases.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages, all in accordance with the present invention.

Figure 1:
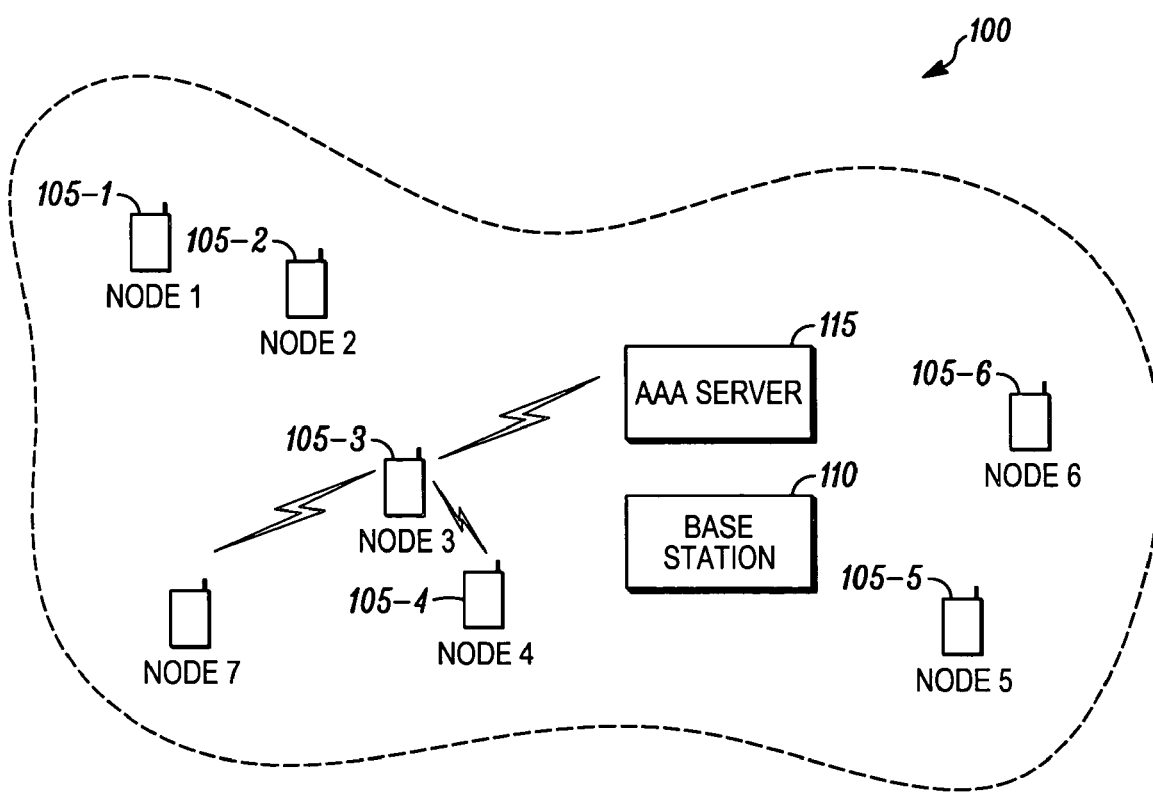
FIG. 1 is a schematic diagram of a communication network comprising a plurality of communication nodes, according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to providing credit for participation in an ad hoc network. Accordingly, the apparatus components and method steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of providing credit for participation in an ad hoc network described herein. The non-processor circuits may include, but are not limited to, a radio receiver, a radio transmitter, signal drivers, clock circuits, power source circuits, and user input devices. As such, these functions may be interpreted as steps of a method to provide credit for participation in an ad hoc network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

Referring to FIG. 1, a schematic diagram of a communication network 100 comprising a plurality of communication nodes 105-n, according to an embodiment of the present invention is illustrated. The network 100 may be, for example, a wireless Mobile Ad Hoc Network (MANET), and the nodes 105-n may be associated with devices such as mobile telephones or handheld radios. Also, a base station 110 may form part of the network 100 and function as both a network node and as a wireless local area network (WLAN) access point (AP) that provides a gateway to other wireline networks. Further, a AAA (authentication, authorization, accounting) server 115 may manage AAA procedures associated with the network 100. As described in more detail below, data are routed through the network 100 based on various network topology factors including, for example, node position, node transmitting power, node battery power, and a willingness of a particular node 105-n to act as an intermediate node 105-n for relaying messages between other nodes 105-n in the network 100.

Maintaining a high Quality of Service (QoS) for users of the network 100, and for users of ad hoc networks generally, requires adherence to various principles such as minimizing required transmission power, maximizing network range, minimizing radio frequency (RF) interference, and minimizing unnecessary or redundant transmissions between network nodes 105-n. Required transmission power can be decreased, and network range can be simultaneously increased, by increasing a number of nodes 105-n that are willing to act as intermediate nodes 105-n. For example, as illustrated in FIG. 1, consider that node 105-1 seeks to transmit a message to node 105-6. One possible multi-hop path for such a message is from node 105-1, then to node 105-2, then to node 105-3, then to node 105-4, then to the base station 110, then to node 105-5, and finally to the destination node 105-6. Node 105-6 then can respond by transmitting a response message back to node 105-1 using the same path in reverse order. Such multi-hop capabilities enable the range of the network 100 to be expanded, limited only by the number and position of intermediate nodes 105-n in the network. Also, the close proximity of the nodes 105-n enable each intermediate node 105-n to forward a message to another node 105-n using a lower transmission power than would be otherwise necessary.

The principles of minimizing radio frequency (RF) interference, and minimizing unnecessary or redundant transmissions between network nodes 105-n also complement each other. Reducing a total number of transmissions in the network 100 directly results in less RF interference, and also conserves battery power at the individual nodes 105-n.

In accordance with some embodiments of the present invention, one function of the AAA server 115 is to provide incentives for the nodes 105-n to act as intermediate nodes 105-n. That can be accomplished by recording at the AAA server 115 a credit for every time a node 105-n relays a message in the network 100 between two other nodes 105-n. According to the prior art, it has been proposed that a AAA server record credits to intermediate network nodes by receiving a transmission from each intermediate node every time a data packet is relayed between network nodes. However, such transmissions between network nodes and a AAA server can significantly increase total network traffic, which can lead to increased congestion, a need for higher transmission power, and a reduced overall QoS for network users.

Figure 2:
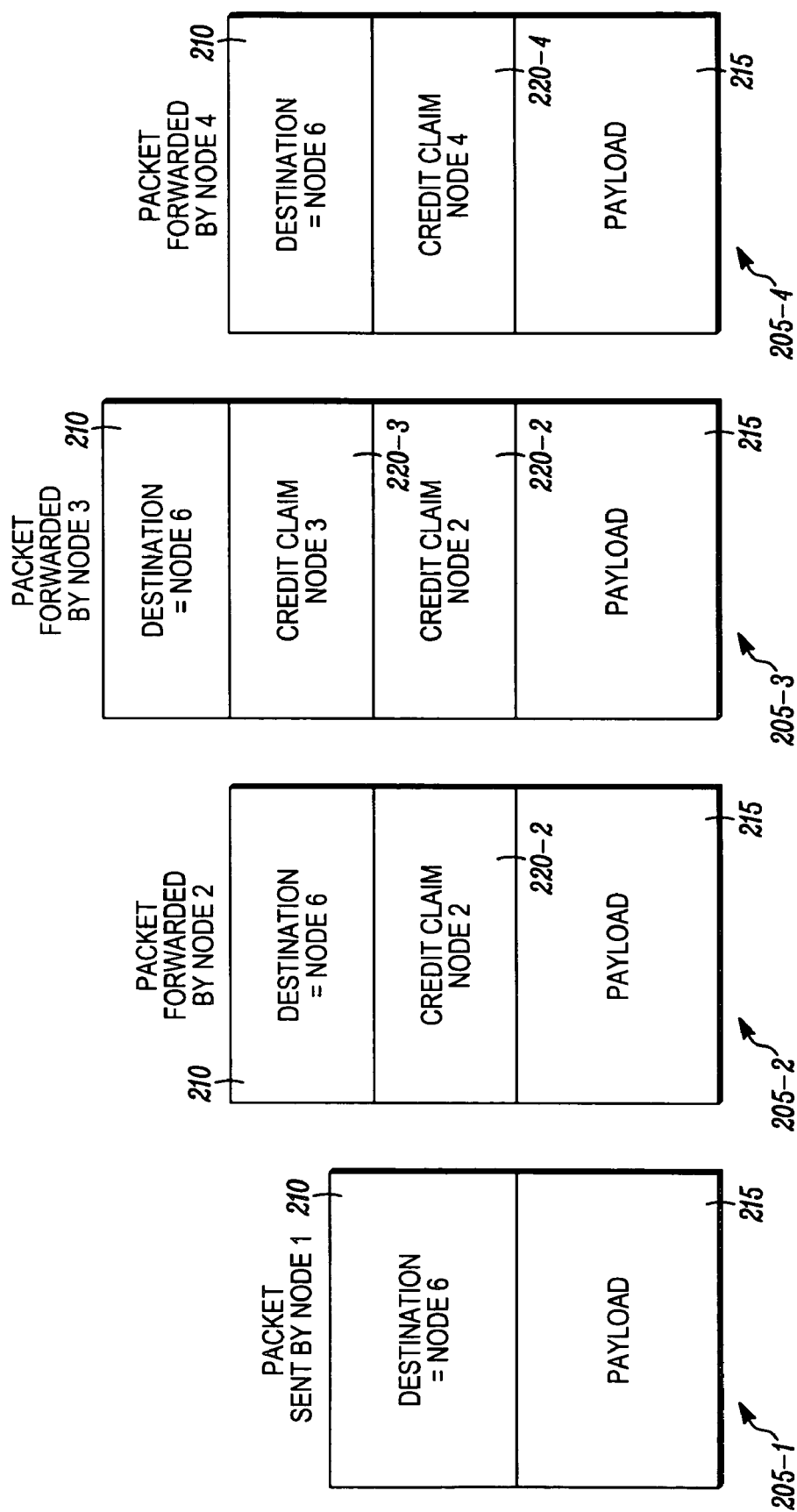
FIG. 2 is a schematic diagram illustrating features of specific data packets that are used to relay a data payload between nodes in an ad hoc wireless communication network, according to an embodiment of the present invention.

Referring to FIG. 2, a schematic diagram illustrating features of specific data packets 205-n that are used to relay a data payload from node 105-1 to node 105-6 in the network 100, according to an embodiment of the present invention is illustrated. Although only components of the data packets 205-n that assist in describing embodiments of the present invention are illustrated, various other components will be understood by those skilled in the art to be included in the data packets 205-n. A first data packet 205-1 is transmitted from node 105-1 to node 105-2. The packet 205-1 comprises a header component 210 and a payload component 215. The header component 210 identifies the destination node 105-6, and may also include other data such as path routing data. The payload component 215 can include any type of payload data, such as voice data, signaling data, or other message data that the node 105-1 seeks to send to the node 105-6. The node 105-2 receives the packet 205-1 and reads the header component 210 and determines that the payload component 215 requires relaying to another node 105-n. The node 105-2 therefore constructs a second packet 205-2 for transmission to the intermediate node 105-3. The second packet 205-2 also comprises a header component 210 and a payload component 215.

In accordance with the present invention, the second packet 205-2 further comprises a credit claim component 220-2. The credit claim component 220-2 includes credit claim data that enable the node 105-2 to obtain credit for acting as an intermediate node 105-2 and relaying the payload component 215 between node 105-1 and node 105-3. For example, according to one embodiment of the present invention, the credit claim component 220-2 comprises an identification of the node 105-2, such as a media access control (MAC) address that uniquely identifies the node 105-2. The credit claim component 220-2 can also include, for example, verification credentials that prove that the node 105-2 acted as an intermediate node 105-2 for forwarding the payload component 215.

Instead of transmitting the credit claim component 220-2 associated with the node 105-2 directly from the node 105-2 to the AAA server 115, the credit claim component 220-2 is forwarded with the packet 205-2 to the node 105-3. This process reduces the total number of messages transmitted in the network 100, thus improving network efficiency and increasing network QoS.

The node 105-3 receives the packet 205-2 and reads the header component 210 and determines that the payload component 215 requires relaying to another node 105-n. The node 105-3 therefore constructs a third packet 205-3 for transmission to the intermediate node 105-4. The third packet 205-3 also comprises a header component 210 and a payload component 215 that forwards the original payload data sent from node 105-1. The credit claim data from the credit claim component 220-2 associated with node 105-2 is also forwarded in the packet 205-3. Further, a second credit claim component 220-3 associated with the node 105-3 is also included in the packet 205-3. The credit claim component 220-3 associated with the node 105-3 includes credit claim data that enable the node 105-3 to obtain credit for acting as an intermediate node 105-3 and relaying the payload component 215 between node 105-2 and node 105-4.

Multiple credit claim components 220-n can continue to be added to data packets 205-n as a payload component 215 is forwarded through the network 100. However, as will be understood by those skilled in the art, if the number of hops required to route a payload component 215 through the network 100 exceeds a particular threshold, then the network efficiency gain achieved by eliminating communications between intermediate nodes 105-n and the AAA server 115, is outweighed by the network efficiency loss caused by the additional credit claim data that are required to be transmitted in each intermediate data packet 205-$n$. That is because the multiple credit claim components 220-$n$ in each intermediate data packet 205-$n$ add up to a significant proportion of the total size of each packet 205-$n$.

According to an embodiment of the present invention, after the node 105-4 receives the third data packet 205-3, the node 105-4 may determine that adding three credit claim components 220-2, 220-3, 220-4 (one for each of the intermediate nodes 105-2, 105-3, and 105-4) to a fourth intermediate data packet 205-4 would reduce overall network efficiency. Therefore, the node 105-4 compiles the credit claim data from each of the credit claim components 220-2, 220-3 in the packet 205-3 and transmits a credit accounting data packet to a credit accounting authority. For example, the credit accounting authority can be the AAA server 115 or another node 105-$n$ that manages credit claim data. The credit accounting data packet is any type of packet that transmits credit claim data to the credit accounting authority. The credit accounting data packet can include each of the credit claim components 220-2, 220-3 from packet 205-3, or alternatively can include an aggregate summary of the credit claim data from each of the credit claim components 220-2, 220-3 from packet 205-3. After receiving the credit accounting data packet, the credit accounting authority ensures that each intermediate node 105-2 and intermediate node 105-3 are properly validated and receive appropriate credit for participating in the network 100.

The node 105-4 then constructs a fourth data packet 205-4 for transmission to the base station 110. The fourth packet 205-4 also comprises a header component 210 and a payload component 215 that forwards the original payload data sent from node 105-1. However, because the node 105-4 transmits the credit accounting data packet to the credit accounting authority (either before or after transmission of the fourth data packet 205-4), there is no need to include credit claim components 220-2, 220-3 concerning the earlier intermediate node 105-2 and intermediate node 105-3 in the fourth data packet 205-4. Therefore, the data packet 205-4 includes only a single credit claim component 220-4 associated with the node 105-4, and which includes information that enables the node 105-4 to obtain credit for acting as an intermediate node 105-4 and relaying the payload component 215 between node 105-3 and the base station 110. Those skilled in the art will appreciate that the base station 110 is described here as only an alternative example of a network node through which the payload component 215 is routed, and various other embodiments of the invention do not include use of a base station 110.

The process described above then continues until the payload component 215 is delivered to the destination node 105-6. Finally, the destination node 105-6 transmits another credit accounting data packet to the credit accounting authority, so as to provide credit to any intermediate nodes 105-$n$ that relayed the payload component 215 since transmission of the previous credit accounting data packet.

According to an alternative embodiment of the present invention, an intermediate node 105-$n$ can also perform some of the functions of the AAA server 115. For example, according to a specified hierarchy, some intermediate nodes 105-$n$ or the base station 110 can be designated as charging collection endpoints. Such intermediate nodes 105-$n$ or the base station 110 will validate charging credentials included in credit claim data, and then delete previous intermediate node identifications from the credit claim data. An aggregated summary of the credit claim data then can be stored at the designated intermediate nodes 105-$n$ until it is collected by a credit accounting authority.

It is generally desirable that credit claim data cannot be maliciously modified or inappropriately fabricated, so that nodes 105-$n$ cannot obtain credit for network participation where such credit has not been earned. According to still another embodiment of the present invention, such malicious modifications or inappropriate fabrications of credit claim data can be deterred using data encryption techniques. For example, the credit claim component 220-2 can include an authentication digest, which is generated using an encryption algorithm, based on particular credit claim data included in the credit claim component 220-2. The authentication digest can be generated using a key that is shared between the node 105-2 and the AAA server 115. Subsequent intermediate nodes such as node 105-3 and node 105-4 then are deterred from maliciously modifying the credit claim data in the credit claim component 220-2. That is because if credit claim data on which the authentication digest is based are modified, such modification will be detected at the AAA server 115 when the received credit claim component 220-2 is compared with the digest. Maliciously modified credit claim data then can be discarded by the AAA server 115. In addition, a digest generated by node 105-2 can be required as a field that is protected by a digest generated by node 105-3. In the embodiment illustrated in FIG. 2, that deters node 105-3 from deleting the credit claim component 220-2 from the packet 205-3.

Figure 3:
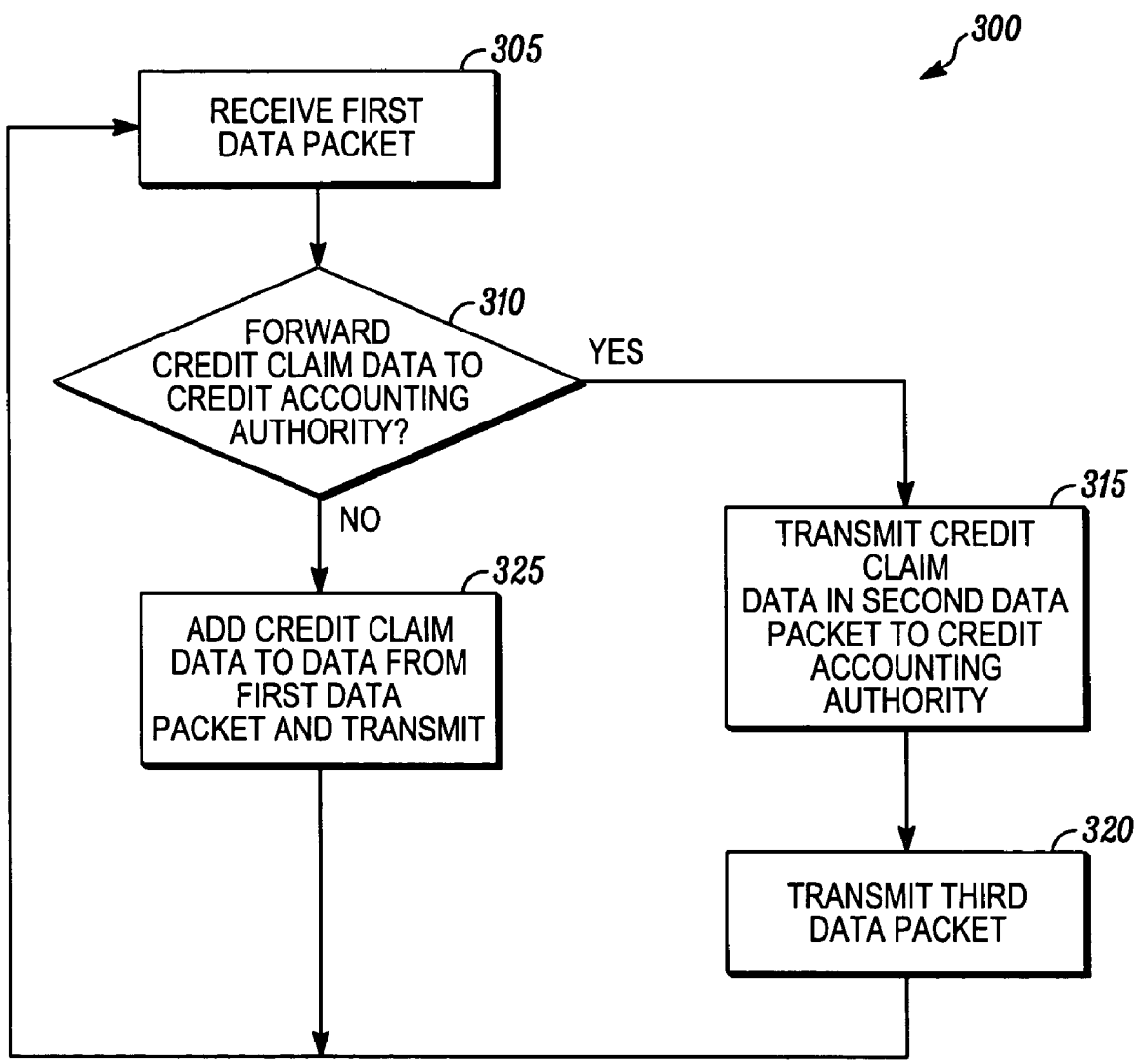
FIG. 3 is a general flow diagram illustrating a method for providing credit for participation in an ad hoc wireless communication network, according to an embodiment of the present invention.

Referring to FIG. 3, a general flow diagram illustrates a method 300 for providing credit for participation in an ad hoc wireless communication network, according to an embodiment of the present invention. At step 305, a first data packet is received at a first network node from a second network node, and the first data packet includes both payload data and credit claim data. For example, referring to the description above, the node 105-4 receives the packet 205-3 from the node 105-3. The first network node is thus acting as an intermediate node for relaying data. At step 310, it is determined whether credit claim data included in the first data packet should be forwarded from the first network node to a credit accounting authority. If so, then at step 315 at least some of the credit claim data are transmitted from the first network node in a second data packet, such as the credit claim accounting data packet described above, to a credit accounting authority, such as the AAA server 115. According to some embodiments, only some of the credit claim data needs to be forwarded, because it is sometimes possible to compress the credit claim data into an aggregate summary. At step 320, a third data packet is then transmitted from the first network node to a third network node.

If at step 310 it is determined that the credit claim data do not need to be currently forwarded to a credit accounting authority, then at step 325 the credit claim data are added to data from the first data packet and transmitted. For example, in the network 100 the data packet 205-4 is transmitted from the node 105-4 to the base station 110. Step 325 effectively defers the forwarding of the credit claim data to a credit accounting authority. Concerning the first network node, the method 300 then cycles back to step 305 where the first network node may receive another data packet and again perform as an intermediate node.

Those skilled in the art will recognize that the present invention can be embodied in a wireless electronic device, such as a device associated with a network node 105-$n$ or the base station 110. The device can be, for example, a mobile phone, handheld radio device, personal digital assistant (PDA), notebook computer, base transceiver station (BTS), or network router. The device can include a standard microprocessor or application specific integrated circuit (ASIC)

operatively connected to a computer readable medium such as a random access memory (e.g., static random access memory (SRAM)), read only memory (e.g., programmable read only memory (PROM), or erasable programmable read only memory (EPROM)), or hybrid memory (e.g., FLASH) as is well known in the art. The medium then comprises computer readable program code components that, when processed by the microprocessor, are configured to execute the above described steps of the method 300.

Advantages of embodiments of the present invention thus include more efficient accounting of credits for intermediate node participation in ad hoc wireless communication networks. Rather than requiring a separate transmission signal for credit claim data from each intermediate node in a network, credit claim data can be accumulated from a plurality of multi-hop intermediate nodes. The accumulated credit claim data are then transmitted to a credit accounting authority only when necessary. Further, accumulated credit claim data can be compressed into an aggregated summary before being transmitted to a credit accounting authority. That can improve network efficiency by reducing a total number of data packets that are transmitted in a network, and also by reducing an amount of overhead data bytes included in transmitted packets. Accurate accounting of credits for intermediate node network participation provides an incentive for additional intermediate node network participation. That results in a more efficient network, less network congestion and improved QoS for network users.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for providing credit for participation in an ad hoc wireless communication network, the method comprising:
   receiving at a first network node a first data packet transmitted from a second network node, the first data packet including payload data and credit claim data;
   determining at the first network node that the credit claim data should be forwarded to a credit accounting authority;
   transmitting, from the first network node, a second data packet to the credit accounting authority, where the second data packet includes some of the credit claim data; and
   transmitting, from the first network node, a third data packet to a third network node, where the third data packet includes the payload data.

2. The method of claim 1, wherein determining at the first network node that the credit claim data should be forwarded to the credit accounting authority is based on a total size of the credit claim data.

3. The method of claim 1, wherein the second data packet that includes some of the credit claim data comprises an aggregate summary of the credit claim data.

4. The method of claim 1, wherein determining at the first network node that the credit claim data should be forwarded to the credit accounting authority is based on a status of the first network node.

5. The method of claim 1, wherein the credit claim data comprise an authentication digest that is based on some of the credit claim data.

6. The method of claim 1, wherein the credit accounting authority is a AAA (Authentication, Authorization, Accounting) server associated with the network.

7. The method of claim 1, wherein the third data packet comprises additional credit claim data for providing credit to the first network node.

8. The method of claim 7, wherein the additional credit claim data comprises an identification of the first network node and verification credentials of the first network node.

9. The method of claim 1, wherein the first, second, and third network nodes are each an intermediate node used for transmission of the payload data from a source node to a destination node in the network.

10. A system for providing credit for participation in an ad hoc wireless communication network, comprising:
    computer readable program code components configured to receive at a first network node a first data packet transmitted from a second network node, the first data packet including payload data and credit claim data;
    computer readable program code components configured to determine at the first network node that the credit claim data should be forwarded to a credit accounting authority;
    computer readable program code components configured to transmit, from the first network node, a second data packet to the credit accounting authority, where the second data packet includes some of the credit claim data; and
    computer readable program code components configured to transmit, from the first network node, a third data packet to a third network node, where the third data packet includes the payload data.

11. The system of claim 10, wherein determining at the first network node that the credit claim data should be forwarded to the credit accounting authority is based on a total size of the credit claim data.

12. The system of claim 10, wherein the second data packet that includes some of the credit claim data comprises an aggregate summary of the credit claim data.

13. The system of claim 10, wherein determining at the first network node that the credit claim data should be forwarded to the credit accounting authority is based on a status of the first network node.

14. The system of claim 10, wherein the credit claim data comprise an authentication digest that is based on some of the credit claim data.

15. The system of claim 10, wherein the credit accounting authority is a AAA (Authentication, Authorization, Accounting) server associated with the network.

16. The system of claim 10, wherein the third data packet comprises additional credit claim data for providing credit to the first network node.

17. The system of claim 16, wherein the additional credit claim data comprises an identification of the first network node and verification credentials of the first network node.

18. The system of claim 10, wherein the first, second, and third network nodes are each an intermediate node used for transmission of the payload data from a source node to a destination node in the network.

19. A system for providing credit for participation in an ad hoc wireless communication network, the system comprising:

means for receiving at a first network node a first data packet transmitted from a second network node, the first data packet including payload data and credit claim data;

means for determining at the first network node that the credit claim data should be forwarded to a credit accounting authority;

means for transmitting, from the first network node, a second data packet to the credit accounting authority, where the second data packet includes some of the credit claim data; and means for transmitting, from the first network node, a third data packet to a third network node, where the third data packet includes the payload data.

* * * * *